(12) United States Patent  (10) Patent No.: US 8,464,356 B2
Ishiguro  (45) Date of Patent: Jun. 11, 2013

(54) PERSONAL LIBRARY ON NET

(75) Inventor: Ryuji Ishiguro, Los Gatos, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 356 days.

(21) Appl. No.: 12/553,028

(22) Filed: Sep. 2, 2009

(65) Prior Publication Data

US 2011/0055933 A1    Mar. 3, 2011

(51) Int. Cl.
*H04L 29/06*    (2006.01)
(52) U.S. Cl.
USPC .............................. 726/27; 705/59
(58) Field of Classification Search
None
See application file for complete search history.

(56) References Cited

U.S. PATENT DOCUMENTS

| | | | |
|---|---|---|---|
| 7,020,704 B1 | 3/2006 | Lipscomb et al. | |
| 7,278,165 B2 | 10/2007 | Molaro | |
| 7,546,353 B2 * | 6/2009 | Hesselink et al. | 709/216 |
| 7,890,661 B2 * | 2/2011 | Spurgat et al. | 709/248 |
| 7,937,451 B2 * | 5/2011 | Ho et al. | 709/217 |
| 8,001,612 B1 * | 8/2011 | Wieder | 726/28 |
| 2002/0164201 A1 * | 11/2002 | Lempfer et al. | 403/267 |
| 2005/0033700 A1 * | 2/2005 | Vogler et al. | 705/57 |
| 2005/0183021 A1 * | 8/2005 | Allen et al. | 715/747 |
| 2005/0281185 A1 * | 12/2005 | Kawasaki | 369/275.3 |
| 2007/0061893 A1 * | 3/2007 | Black et al. | 726/27 |
| 2007/0089174 A1 | 4/2007 | Bader et al. | |
| 2007/0190978 A1 * | 8/2007 | White et al. | 455/412.1 |
| 2007/0208668 A1 | 9/2007 | Candelore | |
| 2007/0239612 A1 * | 10/2007 | Fukushima et al. | 705/51 |
| 2007/0266093 A1 * | 11/2007 | Forstall et al. | 709/204 |
| 2008/0091613 A1 | 4/2008 | Gates et al. | |
| 2008/0103977 A1 * | 5/2008 | Khosravy et al. | 705/59 |
| 2008/0109656 A1 * | 5/2008 | Kotzin | 713/165 |
| 2008/0255994 A1 * | 10/2008 | Schnell et al. | 705/52 |
| 2008/0256646 A1 * | 10/2008 | Strom et al. | 726/29 |
| 2008/0270307 A1 * | 10/2008 | Olson et al. | 705/51 |
| 2009/0196123 A1 * | 8/2009 | Gautam | 368/52 |
| 2009/0323562 A1 * | 12/2009 | Cho et al. | 370/277 |
| 2010/0043077 A1 * | 2/2010 | Robert | 726/27 |
| 2010/0186066 A1 * | 7/2010 | Pollard | 726/3 |

OTHER PUBLICATIONS

Bakshi, Karun; Oracle Database Lite 10gR3 Automatic Synchronization White Paper; Aug. 2008; Oracle; pp. 2-5.*
Kyung-Ah Chang et al.,"Multimedia Rights Management for the Multiple Devices of End-User", IEEE, 2003, pp. 1-6, Proceedings of the 23rd International Conference on Distributed Computing Systems Workshops (ICDCSW/03), Samsung Electronics.

* cited by examiner

*Primary Examiner* — Gilberto Barron, Jr.
*Assistant Examiner* — Malcolm Cribbs
(74) *Attorney, Agent, or Firm* — Haverstock & Owens LLP (57) ABSTRACT

A personal library on a network enables content to be distributed in a manner that is able to be regulated to prevent users from violating copyright law yet allows user to use the content on more than one device. The personal library receives content from a store and/or contains content and then provides the content including a content management implementation to user devices.

27 Claims, 5 Drawing Sheets

PERSONAL LIBRARY ON NET

FIELD OF THE INVENTION

The present invention relates to the field of networking. More specifically, the present invention relates to a personal library on a network.

BACKGROUND OF THE INVENTION

Cloud computing is becoming popular as people have multiple network devices such as a mobile phone besides their Mac/PC. Cloud computing is inevitable when a person wants to keep his personal data such as Mail, Contacts, Calendar and other data in synchronization among the devices. There are already some cloud services running on the Internet. But cloud computing does not lend itself well to content that a person purchases on online stores. The person might be able to "share" the content among his devices if Digital Rights Management (DRM) allows, but this is not always the case. The content tends to be bound to a device to prevent a copy-back attack or for security/business reasons. This makes it difficult to manage the content on a server and utilize the content on a cloud computing type of service. Even if DRM allows sharing content, copying or streaming the content locally between devices is not sufficient when the person is no longer able to rely on a PC or local server. Even if a device is able to decrypt the content, this does not necessarily mean the content is able to be played back/viewed on that device because of differences of the video profiles or a necessity of metadata, for example. In addition, local sharing is not related to global "sync." For example, a person is not able to purchase content on a home computer and then use the content in a tent (e.g. on a mobile device). On the other hand, it appears easy to share protected content among the devices using a centric server if the content is not bound to a device, as long as the provider disclaims control of the content, for example, a case where the provider sells the content, and a user is able to copy it freely among registered devices. But if the provider wishes to keep the control of the content (e.g. a case of rental content), this model obviously does not work.

SUMMARY OF THE INVENTION

A personal library on a network enables content to be distributed in a manner that is able to be regulated to prevent users from violating copyright law yet allows user to use the content on more than one device. The personal library receives content from a store and/or contains content and then provides the content including a content management implementation to user devices.

In one aspect, a system comprises a content store for storing content, a personal library coupled to the content store for providing use management of the content and a plurality of user devices in communication with the personal library for receiving and presenting the content on each device. The personal library incorporates a data block with the content to provide the use management. The data block includes at least one of a valid content indicator, a device list and a content list. The valid content indicator is a bitmap. The bitmap is device specific. The system further utilizing Digital Rights Management (DRM) to provide the use management. The personal library synchronizes the content among the personal library and the plurality of devices. A notification is pushed by the personal library to trigger the synchronizing. The notification occurs automatically when the personal library is changed. The use management controls delivery of the content among the plurality of devices. The personal library includes a database for managing a content list and a device list for each user. An advertisement is coupled with the content. The plurality of devices are each registered with the personal library. The content is checked in/out between the content store and the personal library. The content is selected from the group consisting of video, music, images and documents. The plurality of devices are selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a method of distributing content to a plurality of devices comprises communicating between a personal library and information providers, combining management information with the content in the personal library and providing the content including the management information to the plurality of devices. Communicating includes receiving the content from the information providers. A synchronization process is used for providing the content to ensure a status of the content is correct. The further comprises registering the plurality of devices to enable usage of the content on the plurality of devices and unregistering a device of the plurality of devices to not receive the content to the device. The information providers include at least one of a service provider and a Digital Rights Management (DRM) server. The management information includes Digital Rights Management (DRM) information and Mobile Rights Management (MRM) information. The DRM information and the MRM information are embedded within the content.

In yet another aspect, a system implemented on a device comprises a management module for managing content and management information as protected content and a sync module for distributing the protected content to a plurality of user devices. The management module further monitors the accessibility of the content. The management information includes at least one of a valid content indicator, a device list and a content list.

In another aspect, a device comprises a memory for storing an application, the application for communicating between a personal library and an information provider including receiving content from the information provider, embedding management information with the content in the personal library and distributing the content including the management information to the plurality of devices and a processing component coupled to the memory, the processing component configured for processing the application.

In another aspect, a network of devices comprises a content store device for storing and supplying content, a licensing device for providing licensing information, a personal library device containing a personal library for providing use management of the content using the licensing information and user information and a plurality of user devices for providing the user information, receiving the content and presenting the content on each device.

DETAILED DESCRIPTION OF THE PREFERRED EMBODIMENT

In an implementation where content is managed on a centralized server, it is logical that the rights to the content are managed in a consolidated way rather than the way of Digital Rights Management (DRM) where each client is responsible for managing rights locally. For example, a user rents three videos and then wants to rent another one, but to rent the next one, one of the first three videos has to be returned, similar to the Netflix® plan. This is able to work with one device using a technique such as check-in/out between the server and a device. But, if the first three videos are rented on a user's personal computer, and then the user wants to view the fourth video on his mobile phone, using the standard model, the user would likely be unable to copy the video from his PC to the mobile phone; otherwise, the user would be able to make multiple copies and keep one or more copies.

Figure 1:
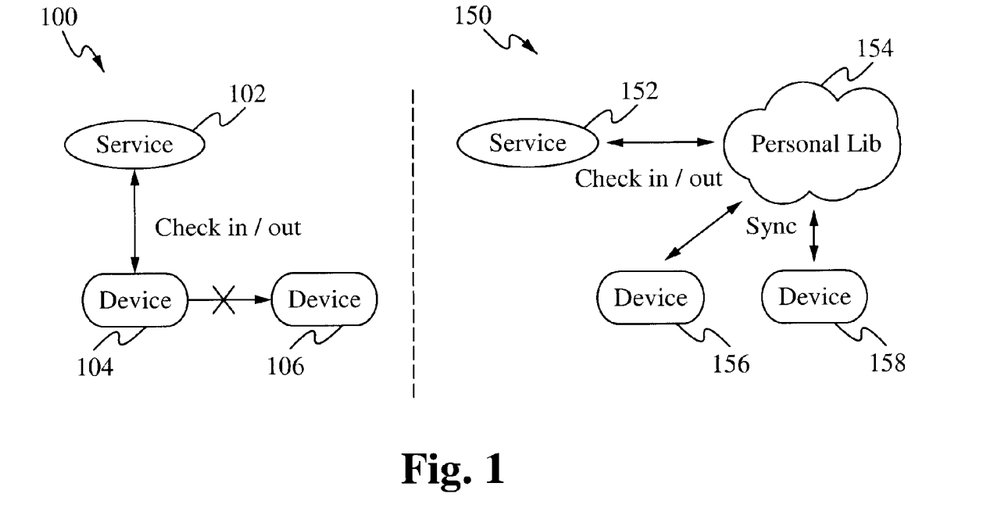
FIG. 1 illustrates an exemplary representation of an implementation using only DRM and an implementation using a personal library according to some embodiments.

FIG. 1 illustrates an exemplary representation of an implementation using only DRM and an implementation using a personal library according to some embodiments. In the DRM only implementation 100, a service 102 is able to be provided to a first device 104 (e.g. a movie is able to be checked in and out). However, the service 102 is not able to be provided to or shared with a second device 106.

In the personal library implementation 150, a service 152 is able to be provided to a personal library 154 (e.g. checking in/out a movie). The personal library 154 is able to store any type of content (or store a link to any type of content) such as videos, music, books, magazines, newspapers, games and other content. In some embodiments, the personal library 154 does not store any content, and rather, the content is stored on another device. In some embodiments, the personal library includes a store, a web log("blog") and other services. In some embodiments, the store, blog and/or other services are stored on other devices or at other locations. The personal library 154 is then able to distribute the service/content to any number of devices, for example, a first device 156 and a second device 158. The service/content distributed includes a data block with identifying information that enables the personal library to keep track of the service/content. In some embodiments, the distribution of the service/content utilizes synchronization, where synchronization includes pushing and pulling. The synchronization is able to be implemented in any manner such as using HTML and javascript which allows communication through a browser, or a web service API. The devices are able to be any device that is able to communicate with the personal library such as a personal computer, a game console, a mobile device or a network device.

The personal library is a hub service between a user device and a service provider. Each user device handles a particular service individually. The hub service manages what content resides on what user device and provides a unified way to manage content on each device. The mechanism to manage content in a unified way is referred to as Mobile Rights Management (MRM). The user is able to use the content they purchase or rent on any device they have, respecting the original business/licensing rules. Using the check in/out example, checking in/out is performed between the personal library and the service provider, and the content is delivered to each device. In some embodiments, the 'sync' technique is used to deliver the content. In some embodiments, another implementation is used. MRM manages the rights (in the case described above, 3 videos for rent at once) on the personal library and is responsible for keeping the contents securely synchronized among the devices.

MRM is not a version of DRM and does not intend to address DRM interoperability. Rather, MRM is designed to work collaboratively with most commercial DRMs. DRM manages rights of content by enforcing usage rules. To enforce the rules on a client, using cryptographic techniques, DRM encrypts content and manages a corresponding key. On the client side, the device obtains the decryption key in some manner. The client is likely required to be registered to a DRM service in advance of using the content.

MRM is not involved in this content encryption or key delivery system. DRM is still fully responsible for protecting the content. In other words, DRM protects individual content only on a device independently of other devices. MRM ensures the integrity of a set of content and controls the content's delivery among the devices.

Figure 2:
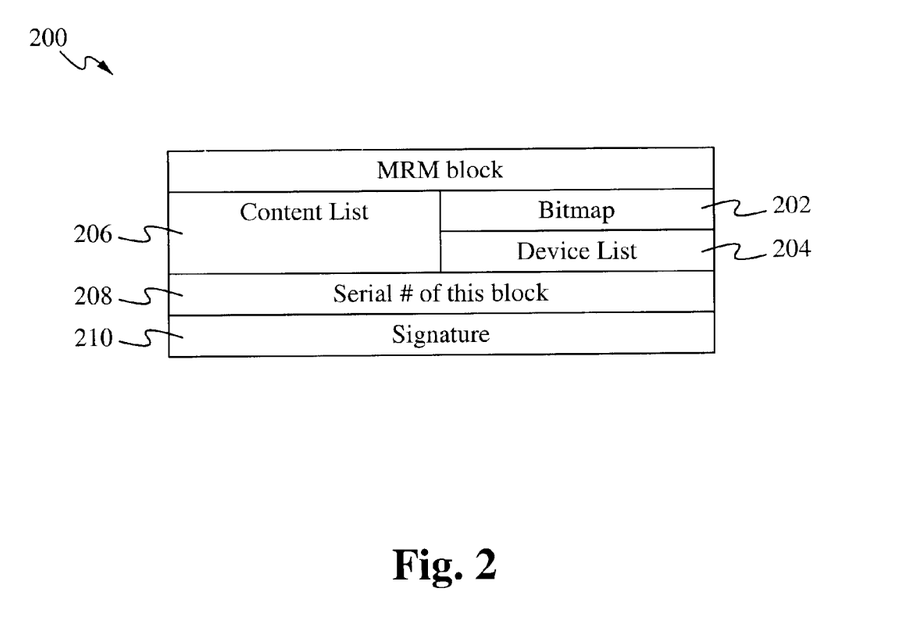
FIG. 2 illustrates an exemplary MRM block according to some embodiments.

FIG. 2 illustrates an exemplary MRM block according to some embodiments. The MRM block 200 includes a bitmap 202, a device list 204, a content list 206, a serial number 208 and a signature 210. The bitmap 202 indicates whether a content is valid or not. The device list 204 is a list of the devices of the user. The content list 206 is a list of the content selected by the user. The serial number 208 and the signature 210 are used to indicate specifics about the MRM block 200. Additional or fewer fields are able to be included depending on the implementation.

Synchronization

In some embodiments, synchronization is used to transfer content between the personal library and client devices. In some embodiments, even if a user wants to simply download content to one specific device, MRM synchronizes all of a content catalog between the personal library and the client, and then downloads the content to the specific device. In some embodiments, the content is downloaded to all of the user's devices.

The content catalog is a list of content a user has purchased with information of what content is valid or invalid at the moment. The catalog is delivered in a data structure, for example, referred to as the MRM block 200 (FIG. 2). A client validates or invalidates content according to this data. This ensures that the content revoked on the server is no longer valid on the client device. For example, the MRM block 200 (FIG. 2) includes a binary representation of valid or invalid content such as a '0' indicating valid and a '1' indicating invalid. For example, if a user checks out Movie1, Movie2 and Movie3 and then checks in Movie2 to be able to check out Movie4, Movie2 should indicate invalid so that the user is not able to access it anymore.

In some embodiments, a bitmap 202 (FIG. 2) is used to indicate whether a content is valid or not because the centralized server manages all content per user. The personal library sorts the content and numbers the content in sequence from zero. Once the content is managed, the position in the bitmap (FIG. 2) does not have to be changed even if the content itself is removed from the library. A bitmap is used due to its small size. For example, a user subscribes to newspapers and magazines and constantly buys and/or rents books, such as 10 content items per day which equals 3650 per year. This is less than 0.5 k bytes, and if the service continues for 100 years, the size still is only 50 k bytes which is less than the title of a jpeg. In some embodiments, other data structures and/or field types are able to be used. In some embodiments, the bitmap is generated on a device-by-device basis. Each device uses a corresponding bitmap.

An MRM block contains a list of all of the devices the user has (or the devices the user registers). The device list is able to be just a list and does not have to have a special structure such as a hierarchical tree. In contrast with this, DRM usually manages all of the devices in the world in a uniform way using a broadcast encryption, which requires a huge setup.

The sync protocol is a simple one-way transmission of the valid content list with its metadata. The client maintains its local database according to this list.

There are some cases where the sync protocol is not appropriate or just not preferable; for example, downloading content on a Web browser without any plugin or special software and copying the content to a tethered device by drag-and-drop. In this case, the file format accommodates a place to convey the MRM block. The terminal device checks if there is an MRM block in the content file and updates the database similar to being sent via the protocol if it exists before using the content.

Push technology is useful to synchronize the content among devices in a timely fashion. Push is also a logical concept not dependent on network protocols. Push is supported in various ways such as the push notification service on an iPhone, RSS or Atom (which is a pull technology) on Mac/PC, or HTTP server push. In some embodiments, push is used to notify a trigger to start the sync protocol, but the actual data transmission is initiated by a client/user (e.g. pull). In some embodiments, content is pushed to a client/user. For example, similar movies, shows or advertisements are able to be pushed.

The notification of a trigger to start the sync occurs automatically any time a change is made in the personal library. With this mechanism, a subscription service, such as a delivery of a newspaper or magazine online is easy—new content is added to the library and/or old content is removed from the library. The content change notification is automatically pushed, and all (registered) devices are synchronized.

It is possible for a user to block sync on purpose to keep some content on the user's device. If this happens, the catalog will be out of sync for the moment, which is a potential problem for the provider of the content. However, as soon as the user attempts to obtain new content, the catalog will synchronize again, thus resolving the problem.

Device Management

In some embodiments, the personal library includes a database or another data structure per user. The database structure depends on the implementation, but generally manages at least the content list and device list per user. As an option, it is possible to have information for a promotion or advertisement, which is able to be pushed with the content, for example.

In some embodiments, only devices that have been registered to the user database on the personal library are able to be synchronized. This enables control over which device is able to obtain content and which is not. This also simplifies management of the device using a Web browser. For example, a user navigates to the personal library via the Internet and logs in and then chooses the devices the user wants to enable on the list. There is no DRM operation involved, and DRM registration/de-registration is unrelated. Even if a device is registered to a DRM service, it is possible to deactivate the device. This is useful when the service limits the number of devices that are able to obtain content at once. Additionally, the user does not need to contact customer service to remove a device. Even if a device is de-registered from a service, the personal library continues to manage the device because it is possible the device is registered to other services.

Once a device is de-registered from a service, MRM invalidates the corresponding content to that service on the content catalog and performs a sync as usual. The device receives the MRM block and is no longer able to use the invalidated content on either the device or the server.

In some embodiments, a unique ID is used for the MRM registration. Any type of identification is possible such as International Mobile Equipment Identity (IMEI). As long as a browser is secure, a user is able to type the ID in the web browser. The client MRM ensures if the MRM block is really targeted by confirming the ID. Even if the DRM registration does not involve the MRM, the two operations are able to be combined for the user's convenience. Since it is very likely that the DRM registration requires a unique device ID and is included in the registration protocols, combining them into one operation improves efficiency.

User Account

To manipulate user information on a web browser (e.g. to edit the device list), the user logs into the system. Typically a security implementation is used such as SSL to protect the session. A Web service API to authorize a user using a Web Services Security Environment (WSSE) username token as well for mainly the Mobile devices in which the web browser is not adequate. The device ID, for example, is sent with the WSSE authorization header.

Store Interface

The personal library is able to be a one-stop online store for mobile devices instead of a content locker. This provides several benefits:

the same protocol and format are able to be used for purchase of content;

the content is able to be optimized for each device at the time of purchase; and the store does not have to handle DRM operations.

To enable the store interface, the following functions are defined: browse, purchase and search. These functions are examples, and more or less functions are able to be defined. Specific implementations of browse, purchase and search are further described herein.

Browse

Browsing is used to retrieve a set of items or a list of content information. The personal library does not care what type of list is defined or the list's meanings. A typical example is "Top Tens" and is able to be stored on the store as:

```
<storeMenuData title="Top Tens">
    <storeMenuItem type="itemInfo" id="0001"/>
    <storeMenuItem type="itemInfo" id="0002"/>
    ...
</storeMenuData>
```

When the list is sent to a client, each item has the actual content information rather than an ID:

```
<storeMenuData title="Top Tens">
    <storeMenuItem type="itemInfo" id="0001"/>
```

-continued

```
<storeBookInfoData title="1984">
    <author name= "George Orwell" id="0001"/>
    <price value="4.79" eBookList= "5.99
contentID="0000000000000000"/>
    <publisher name = "Rosetta Books"/>
    <description id = "0001"/>
    <excerpt id = "0001"/>
    <cover id = "0001"/>
</storeBookInfoData>
</storeMenuItem>
<storeMenuItem type="bookInfo" id="0002"/>
    <storeBookInfoData title="The Adventure of the Christmas
Pudding">
    <author name= "Agatha Christie" id="0002"/>
    <price value="4.79" printList= "9.99" eBookList= "5.99
contentID="0000000000000001"/>
    <publisher name = "HarperCollins"/>
    <description id = "0002"/>
    <excerpt id = "0002"/>
    <cover id = "0002"/>
</storeBookInfoData>
</storeMenuItem>
</storeMenuData>
```

Another typical example is to browse by category or genre. This is able to be:

```
<storeMenuData title="Browse Categories">
    <storeMenuItem title="Biography" id = "10"/>
    <storeMenuItem title="Business" id = "20"/>
</storeMenuData>
```

The list is able to be sent to the client as-is. The client is able to request another list with the ID to follow each item.

Purchase

The personal library is not involved in generating/modifying a user account for purchase. Each store is responsible for that. The WSSE username token is used to verify the username and password between the client and service. The service provides a way to verify the WSSE token.

To make the WSSE token, the client application obtains the username and password. The client calculates the WSSE token and sends it to the personal library with the content ID. The protocol is not necessarily protected by SSL, but because the username and content ID are included, a security layer is able to be utilized to protect users' privacy.

The request URL is able to appear as:
http://ws.ebooks.sony.com/ebook/databases/1/contents-?contentID=0001
and its HTTP header appears as:

```
GET /test HTTP/1.1
Host: ws.ebooks.sony.com
Authorization: WSSE profile = "UsernameToken"
X-WSSE: UsernameToken Username= "Tim", PasswordDigest=
"quR/EWLAV4xLf9Zqyw4pDmfV9OY=",
Nonce="d36e316282959a9ed4c89851497a717f",
Created="2009-01-01T00:00:00Z"
```

Content bought this way is immediately incorporated into the personal library, and then the "sync" starts. The device initiates the Web service API and will download the content without waiting for the "push" notification depending on whether the content is being downloaded on other devices.

Search

The search function returns content or an author list similar to the browsing function. The query string is sent as:

http://ws.ebooks.sony.com/ebook/databases/1/containers/authors?search=Stephen%20King and the result is:

```
<storeSearchResult title="Stephen King" id= "0003">
    <storeMenuItem type="itemInfo" id="00031"/>
        <storeBookInfoData title="Bag of Bones">
            <author name= "Stephen King" id="0003"/>
            <price value="7.19" printList = "9.99" eBookList= "5.99
contentID="0000000000000003"/>
            <publisher name = "Simon & Schuster"/>
            <description id = "2"/>
            <excerpt id = "2"/>
            <cover id = "Bag_of_Bones"/>
        </storeBookInfoData>
    </storeMenuItem>
    <storeMenuItem type="itemInfo" id="00032"/>
        <storeBookInfoData title="Black House">
            <author name= "Stephen King" id="4"/>
            <price value="7.19" printList= "9.99" eBookList= "8.99
contentID="0000000000000004"/>
            <publisher name = "Simon & Schuster"/>
            <description id = "2"/>
            <excerpt id = "2"/>
            <cover id = "Black_House"/>
        </storeBookInfoData>
    </storeMenuItem>
</storeSearchResult>
```

Application

For an exemplary eBook service, any representations are able to be used to indicate what content contains a license and is under MRM control. The client ignores a content which is not under MRM control. A block does not have to be checked every time it is used. Instead, the signature is able to be checked and the local database is updated when the content is delivered by sync.

The process of purchasing content in the past involved several transactions between the client and the content server, the store and the DRM server. Instead, the personal library handles the complex process and as a result provides a single file to the client with the ordinary HTTP GET operation. Not only the license but the layout cache is embedded in the process as well so that the client does not have to do any additional tasks to use the content.

Figure 3:
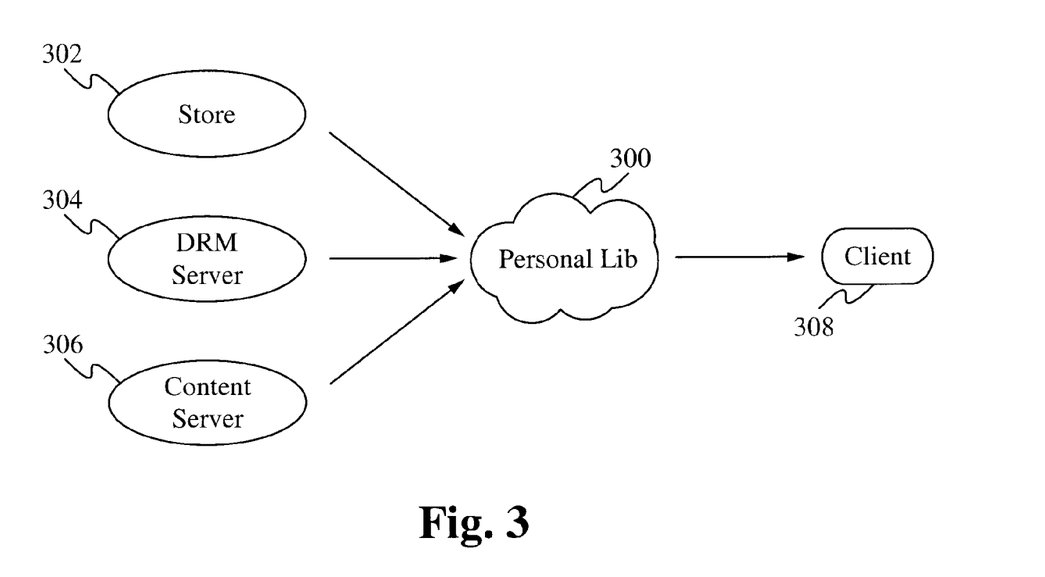
FIG. 3 illustrates an exemplary diagram of a personal library providing licensed content to a user according to some embodiments.

FIG. 3 illustrates an exemplary diagram of a personal library 300 providing licensed content to a user according to some embodiments. A store 302 sends content and a user ID to the personal library 300. A DRM server 304 sends a license to the personal library 300. A content server 306 is also able to send content 306 to the personal library 300. The personal library 300 takes the information and generates content with a license which is sent to one or more client device(s) 308. Included with the license information, the MRM block is also embedded in the content. When the video service decides to start a subscription service or a service which needs to revoke content, the full "sync" functions are used, but embedding the MRM block into the content is also able to be used. The content with the license is able to be used by the client devices without further modification providing convenience for the user.

Since the personal library hub provides a centralized service, it is able to manage each of the devices appropriately even though they are able to have different display sizes, network capabilities and processor performance. This also provides simplicity for users.

Device Registration

As described herein, a device is registered to the DRM service in addition to the personal library. In some embodiments, NEMO and Octopus personalities are installed at manufacturing because of security concerns of delivery of the personalities. The personalization does not matter to the personal library. On the other hand, the Marlin device registration process has to do with the user and device registration of the personal library. In other words, there is no reason to do the two registration processes separately because the registrations are very similar. In Marlin, a user node is generated, and then the device note (e.g. Octopus node) is linked to the user node. The user database of the personal library uses a username and password and requires a user to log in first to perform an operation on the database.

The user database is generated beforehand, and the WSSE username token is sent with SOAP messages of the NEMO protocols. A device unique ID is included in the SAML assertion of each NEMO protocol, and the ID is used as the device unique ID in the user database.

The device de-registration, on the other hand, is different from the Marlin de-registration. There is no need for Marlin de-registration. Once a device is registered, the personalities, the user node and link (and the DRM status) remain until it is removed by an uninstaller, a utility program or a similar implementation. Activating or deactivating devices is done by MRM. This enables removal of the DRM data without concerns of "orphans" and is able to be performed on a Web browser anytime anywhere. The user does not even need to couple a device to de-register the device. This feature is beneficial for a Reader application on open platforms such as Mobile phones or Macs/PCs where users tend to uninstall the application and re-install it frequently. The user does not want to be bothered with de-registration in advance of uninstall. When the application is re-installed, the DRM personalization and registration process is done the same as the first time. The DRM process is performed to obtain keys. The personal library determines if the device is already registered (e.g. has not been de-registered) and does nothing in that case. If the device has been de-registered, the device is re-activated if possible.

Application for Video Service

The content is able to be copied between devices using any implementation such as over a network (e.g. the Internet). In some instances a local copy is preferable, for example, copying video content from device directly to device. MRM is useful for sell-through content (e.g. not bound to any device) and rental content, as well as other content.

In some embodiments, content is bound to a device, and if a user wants to view the content on another device, the content is re-bound to the new device. In the video service, the client software is doing this by re-linking the device node. As another option, content is bound to multiple devices. In some embodiments, when a device is added after a license is issued, the license is re-generated to include the new device. Content is bound to a user. By processing the MRM block correctly on each device, the content is controlled after delivery of the content. If the rental content has a time limitation, the DRM ensures not to play the expired content on a device. MRM also revokes the expired content from the server and will synchronize all of the devices. When a device is removed, the remaining devices are able to continue with the content without changing the license data.

Service—Service Interface

As described herein, MRM is not involved in the DRM operations but as a hub service to devices. A secure content provider interface is provided on top of the MRM framework so that the service providers are not bothered by DRM. Transactions between a service provider and the personal library are protected by SSL, and the personal library encrypts content by a DRM that is supported by the target device. In this way, service providers no longer have to have a DRM themselves. The personal library defines a set of APIs to the service provider.

Figure 4:
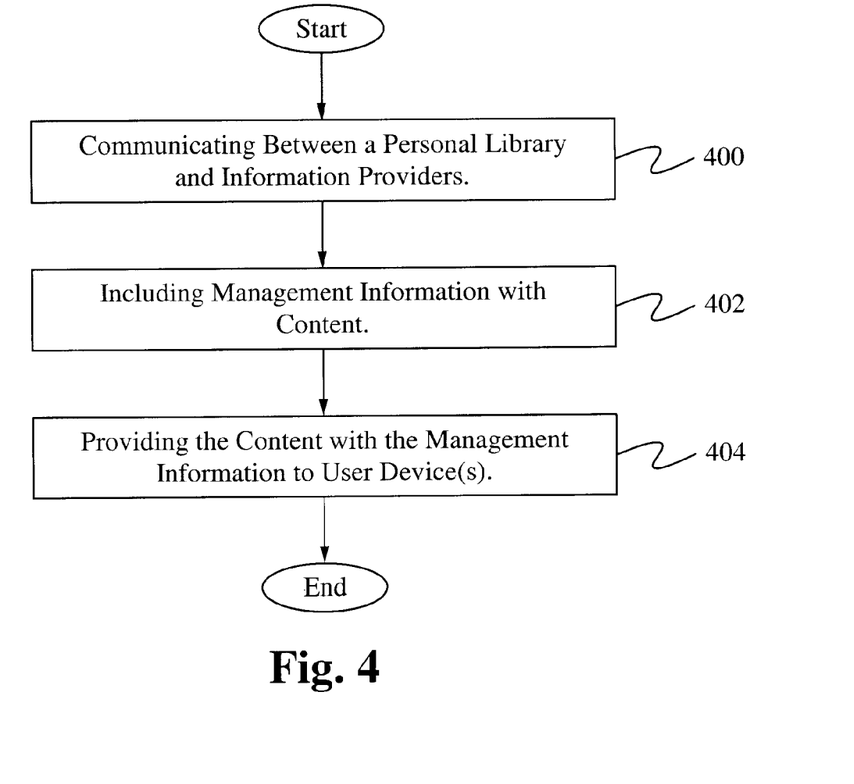
FIG. 4 illustrates a flowchart of a method of utilizing a personal library according to some embodiments.

FIG. 4 illustrates a flowchart of a method of utilizing the personal library according to some embodiments. In the step 400, a personal library communicates with information providers such as a service provider and/or additional devices such as a DRM server. For example, if a user requests to rent a video, the personal library retrieves the video from the service provider. In the step 402, management information is included with the content in the personal library, for example, DRM information and MRM information are included with the content. In some embodiments, the DRM information, the MRM information and the content are combined into a modified content. In some embodiments, the DRM information, the MRM information and the content are linked together. In the step 404, the personal library provides the content including the management information to the user's device(s). In some embodiments, a synchronization process is used to ensure the status of the content is correct, so that content that is disabled is unavailable to the user. Additional steps are able to be involved as well, such as registering devices so that the content is downloaded to the appropriate devices, unregistering devices and other relevant steps.

Figure 5:
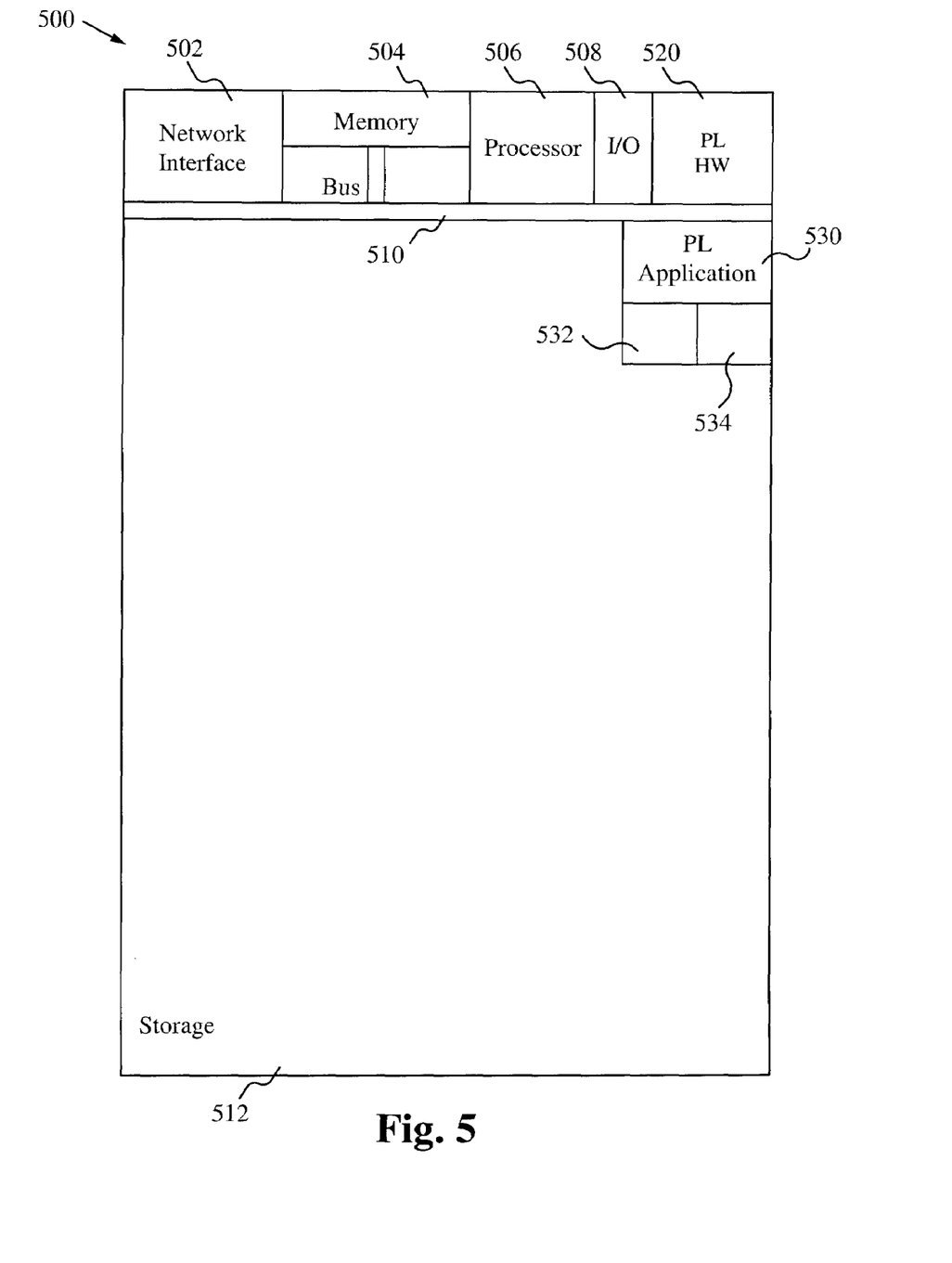
FIG. 5 illustrates a block diagram of an exemplary computing device configured to implement the personal library according to some embodiments.

FIG. 5 illustrates a block diagram of an exemplary computing device 500 configured to implement the personal library according to some embodiments. The computing device 500 is able to be used to acquire, store, compute, communicate/distribute, receive, execute and/or display content such as music, videos, images, documents such as books, magazines, newspapers, web pages and other information For example, a computing device 500 is able to distribute a video to a user. In general, a hardware structure suitable for implementing the computing device 500 includes a network interface 502, a memory 504, a processor 506, I/O device(s) 508, a bus 510 and a storage device 512. The choice of processor is not critical as long as a suitable processor with sufficient speed is chosen. The memory 504 is able to be any conventional computer memory known in the art. The storage device 512 is able to include a hard drive, CDROM, CDRW, DVD, DVDRW, flash memory card or any other storage device. The computing device 500 is able to include one or more network interfaces 502. An example of a network interface includes a network card connected to an Ethernet or other type of LAN. The I/O device(s) 508 are able to include one or more of the following: keyboard, mouse, monitor, display, printer, modem, touchscreen, button interface and other devices. Personal library application(s) 530 are likely to be stored in the storage device 512 and memory 504 and processed as applications are typically processed. More or less components shown in FIG. 5 are able to be included in the computing device 500. In some embodiments, personal library hardware 520 is included. Although the computing device 500 in FIG. 5 includes applications 530 and hardware 520 for personal library applications, the personal library is able to be implemented on a computing device in hardware, firmware, software or any combination thereof. The computing device 500 is able to be a distribution device or a client device. The configuration of the device 500 is able to vary depending on the usage. For example, a distribution device is able to include more processing power than a client device. Furthermore, the client device does not utilize some of the features that the distribution device uses, and thus is not configured the same.

In some embodiments, the personal library application(s) 530 include several applications and/or modules. In some embodiments, the personal library application(s) 530 on the personal library device include a management module 532 and a sync module 534. The content and management information such as the MRM block are combined/linked by the management module 532. Furthermore, the MRM block is generated and updated by the management module 532. Additionally, the management module 534 ensures that the content accessibility of the content is updated and accurate. The sync module 534 distributes the content including the management information to user devices. The modules are able to perform additional tasks as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television, a home entertainment system or any other suitable computing device.

Figure 6:
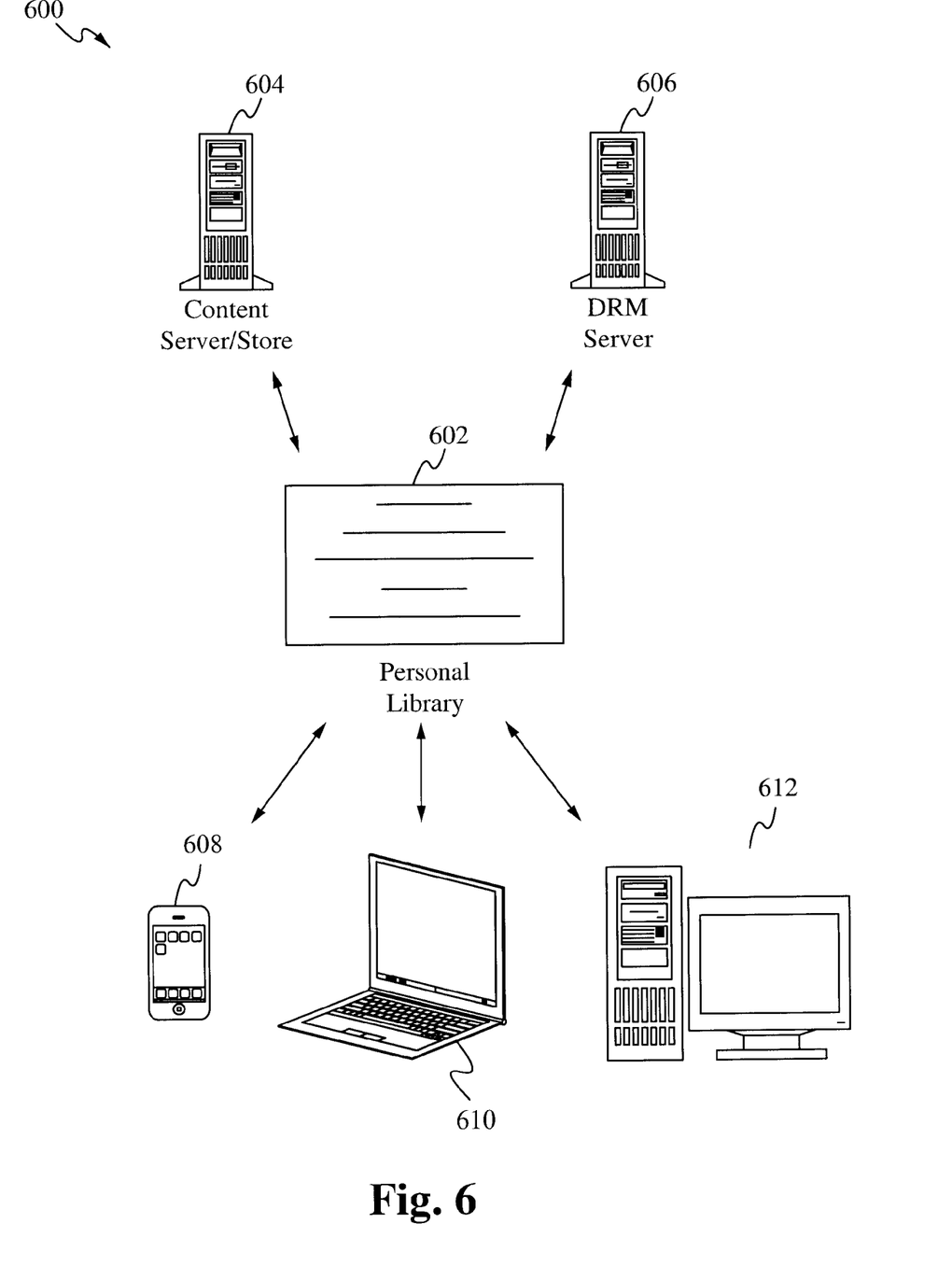
FIG. 6 illustrates a network of devices according to some embodiments.

FIG. 6 illustrates a network of devices 600 according to some embodiments. A personal library device 602 is coupled to a content server/store 604, a DRM server 606 and a set of user devices such as a mobile phone 608, a laptop 610 and a personal computer 612. The personal library device 602 receives content from the content server/store 604. The personal library device 602 also receives DRM information from the DRM server 606. Using user information such as device information, the personal library device 602 generates MRM information such as an MRM data block which is able to be included or embedded into the content. The DRM information is also able to be included or embedded into the content. The content with the MRM and DRM information is sent to the desired device(s) (e.g. 608, 610, 612). As described herein, the content is managed using sync so that changes are automatically distributed throughout the system. The devices 608, 610, 612 are able to present the information to a user (e.g. play a video or song). Fewer or additional devices are able to be included.

Advertisement

Since the personal library is able to keep track of clients' behavior and users' information, personalized advertisements are able to be propagated to the devices easily. The advertisements are able to be targeted for each user depending on the user's device type and the content the user is viewing.

Advertisement information is sent out as a part of the menu data described herein, for example:

```
<storeMenuData title= "Top Tens">
    <advertisementMenuItem id = "0001"/>
    <advertisementMenuItem id = "0002"/>
    <storeMenuItem type = "itemInfo" id="0003"/>
    <storeMenuItem type = "itemInfo" id="0004"/>
    ...
</storeMenuData>
```

"advertisementMenuItem" will have the content information in its body as well as "storeMenuItem." The appearance of the advertisement on the client device depends on the client application.

Figure 7:
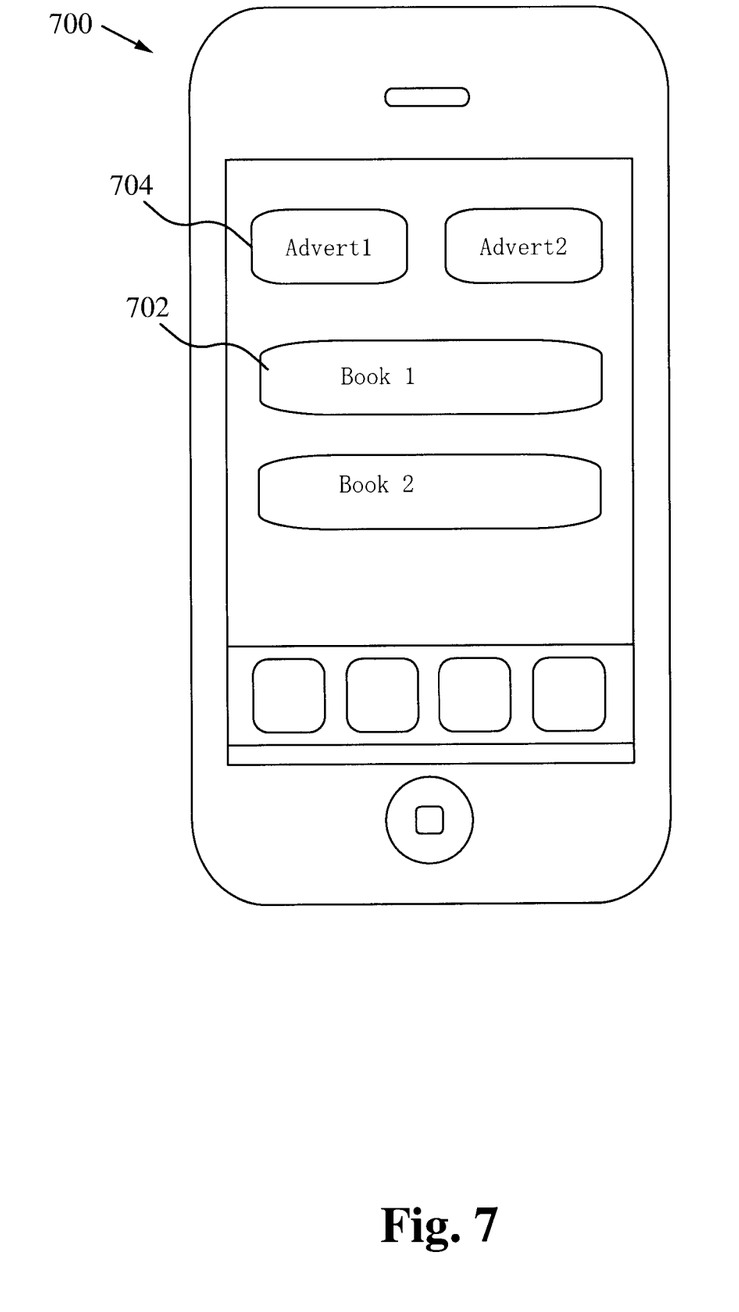
FIG. 7 illustrates a diagram of an exemplary device with an advertisement according to some embodiments.

FIG. 7 illustrates a diagram of an exemplary device 700 with an advertisement according to some embodiments. The device 700 such as a mobile device displays books 702 that a user has purchased or rented. The device 700 also displays one or more advertisements 704. In some embodiments, the advertisements 704 are able to be any advertisement. In some embodiments, the advertisements 704 are related to user input (e.g. purchases, searches and/or others) and/or user information (e.g. age, occupation and/or others). For example, if a user has purchased Steven King books, the advertisements are other Steven King books or other books in the same genre. In some embodiments, the advertisements 704 are for other items. For example, if the user has purchased a subscription to Sports Illustrated magazine, the advertisements are able to include sports paraphernalia, sports drinks and/or other related items.

To utilize the personal library, a user acquires content using the personal library. For example, if a user wants to rent a video to play on his home computer and his laptop, the user is able to do so. Once the content (e.g. video) is downloaded, he is able to play the video as desired. If the user is using the content for a limited period of time (e.g. renting), then the user is able to contact the personal library, so that the video is returned, and the license agreements are maintained.

In operation, the personal library enables a user to acquire and use licensed content on one or more of his devices. The personal library configures the content appropriately (e.g. includes a data block for content management) and then distributes the content to the user's devices. The personal library also maintains information about the content to ensure that licenses are not violated. Once the user's devices receive the content, the user is able to perform any licensed operations on the content. For example, if a user acquires a song on his computer, he is able to play the song. The same song is also able to be downloaded to his mobile device and played on that device without paying double for the same content. Furthermore, since the content is tracked, a user is not able to violate the license and use the content illegally.

Some Embodiments of a Personal Library

1. A system comprising:
   a. a content store for storing content;
   b. a personal library coupled to the content store for providing use management of the content; and
   c. a plurality of user devices in communication with the personal library for receiving and presenting the content on each device.
2. The system of clause 1 wherein the personal library incorporates a data block with the content to provide the use management.
3. The system of clause 2 wherein the data block includes at least one of a valid content indicator, a device list and a content list.
4. The system of clause 3 wherein the valid content indicator is a bitmap.
5. The system of clause 4 wherein the bitmap is device specific.
6. The system of clause 1 further utilizing Digital Rights Management (DRM) to provide the use management.
7. The system of clause 1 wherein the personal library synchronizes the content among the personal library and the plurality of devices.
8. The system of clause 7 wherein a notification is pushed by the personal library to trigger the synchronizing.
9. The system of clause 8 wherein the notification occurs automatically when the personal library is changed.
10. The system of clause 1 wherein the use management controls delivery of the content among the plurality of devices.
11. The system of clause 1 wherein the personal library includes a database for managing a content list and a device list for each user.
12. The system of clause 1 wherein an advertisement is coupled with the content.
13. The system of clause 1 wherein the plurality of devices are each registered with the personal library.

14. The system of clause 1 wherein the content is checked in/out between the content store and the personal library.

15. The system of clause 1 wherein the content is selected from the group consisting of video, music, images and documents.

16. The system of clause 1 wherein the plurality of devices are selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

17. A method of distributing content to a plurality of devices comprising:
    a. communicating between a personal library and information providers;
    b. combining management information with the content in the personal library; and
    c. providing the content including the management information to the plurality of devices.

18. The method of clause 17 wherein communicating includes receiving the content from the information providers.

19. The method of clause 17 wherein a synchronization process is used for providing the content to ensure a status of the content is correct.

20. The method of clause 17 further comprising registering the plurality of devices to enable usage of the content on the plurality of devices and unregistering a device of the plurality of devices to not receive the content to the device.

21. The method of clause 17 wherein the information providers include at least one of a service provider and a Digital Rights Management (DRM) server.

22. The method of clause 17 wherein the management information includes Digital Rights Management (DRM) information and Mobile Rights Management (MRM) information.

23. The method of clause 22 wherein the DRM information and the MRM information are embedded within the content.

24. A system implemented on a device comprising:
    a. a management module for managing content and management information as protected content; and
    b. a sync module for distributing the protected content to a plurality of user devices.

25. The system of clause 24 wherein the management module further monitors the accessibility of the content.

26. The system of clause 24 wherein the management information includes at least one of a valid content indicator, a device list and a content list.

27. A device comprising:
    a. a memory for storing an application, the application for:
        i. communicating between a personal library and an information provider including receiving content from the information provider;
        ii. embedding management information with the content in the personal library; and
        iii. distributing the content including the management information to the plurality of devices; and
    b. a processing component coupled to the memory, the processing component configured for processing the application.

28. A network of devices comprising:
    a. a content store device for storing and supplying content;
    b. a licensing device for providing licensing information;
    c. a personal library device containing a personal library for providing use management of the content using the licensing information and user information; and
    d. a plurality of user devices for providing the user information, receiving the content and presenting the content on each device.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A system comprising:
    a. a content store for storing content including a plurality of content items, wherein the plurality of content items are a part of a content group having group licensing information that restricts the use of the content group as a unit;
    b. a personal library coupled to the content store for providing use management of the content group such that use of the plurality of content items of the content group complies with the restrictions of the group licensing information, wherein to provide the user management the personal library incorporates a data block with the content that includes a valid content indicator and a content list indicating valid content and invalid content based on use management information; and
    c. a plurality of user devices in communication with the personal library for receiving and presenting the content on each device of the plurality of user devices, wherein a push notification is used by the personal library to notify a trigger to start a synchronization protocol but a content transmission of the synchronization protocol is initiated by a user.

2. The system of claim 1 wherein the data block includes a device list.

3. The system of claim 2 wherein the valid content indicator is a bitmap.

4. The system of claim 3 wherein the bitmap is device specific.

5. The system of claim 1 further utilizing Digital Rights Management (DRM) to provide the use management.

6. The system of claim 1 wherein the personal library synchronizes the content among the personal library and the plurality of devices.

7. The system of claim 6 wherein the notification is pushed by the personal library.

8. The system of claim 7 wherein the notification occurs automatically when the personal library is changed.

9. The system of claim 1 wherein the use management controls delivery of the content among the plurality of devices.

10. The system of claim 1 wherein the personal library includes a database for managing a content list and a device list for each user.

11. The system of claim 1 wherein an advertisement is coupled with the content.

12. The system of claim 1 wherein the plurality of devices are each registered with the personal library.

13. The system of claim 1 wherein the content is checked in/out between the content store and the personal library.

14. The system of claim 1 wherein the content is selected from the group consisting of video, music, images and documents.

15. The system of claim 1 wherein the plurality of devices are selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a portable music player, a video player, a DVD writer/player, a television and a home entertainment system.

16. A method of distributing content to a plurality of devices comprising:
   a. communicating between a personal library and information providers to acquire content including a plurality of content items, wherein the plurality of content items are a part of a content group having group licensing information that restricts the use of the content group as a unit;
   b. combining management information including a valid content indicator and a content list indicating valid content and invalid content based on the management information with the content in the personal library;
   c. providing the content including the management information to the plurality of devices; and
   d. restricting use of the plurality of content items of the content group such that the use complies with the restrictions of the group licensing information;
wherein a push notification is used by the personal library to notify a trigger to start a synchronization protocol but a content transmission of the synchronization protocol is initiated by a user.

17. The method of claim 16 wherein communicating includes receiving the content from the information providers.

18. The method of claim 16 wherein a synchronization process is used for providing the content to ensure a status of the content is correct.

19. The method of claim 16 further comprising registering the plurality of devices to enable usage of the content on the plurality of devices and unregistering a device of the plurality of devices to not receive the content to the device.

20. The method of claim 16 wherein the information providers include at least one of a service provider and a Digital Rights Management (DRM) server.

21. The method of claim 16 wherein the management information includes Digital Rights Management (DRM) information and Mobile Rights Management (MRM) information.

22. The method of claim 21 wherein the DRM information and the MRM information are embedded within the content.

23. A system implemented on a device comprising:
   a. a management module programmed to manage content and management information including a valid content indicator and a content list indicating valid content and invalid content as protected content based on the management information, wherein the content comprises a plurality of content items that are a part of a content group having group licensing information that restricts the use of the content group as a unit, and further wherein the management module is programmed to provide use management of the content group such that use of the plurality of content items of the content group complies with the restrictions of the group licensing information; and
   b. a sync module programmed to distribute the protected content to a plurality of user devices, wherein the sync module utilizes a push notification to notify a trigger to start a synchronization protocol but a content transmission of the synchronization protocol is initiated by a user.

24. The system of claim 23 wherein the management module further monitors accessibility of the content.

25. The system of claim 23 wherein the management information includes at least one of a device list and a content list.

26. A device comprising:
   a. a memory for storing an application, the application for:
      i. communicating between a personal library and an information provider including receiving content from the information provider, wherein the content comprises a plurality of content items that are a part of a content group having group licensing information that restricts the use of the content group as a unit;
      ii. embedding management information including a valid content indicator, a device list and a content list indicating valid content and invalid content based on the management information with the content in the personal library;
      iii. providing use management of the content group by restricting the use of the plurality of content items of the content group by a plurality of devices according to the restrictions of the group licensing information; and
      iv. distributing the content including the management information to the plurality of devices, wherein a push notification is used by the application to notify a trigger to start a synchronization protocol but a content transmission of the synchronization protocol is initiated by a user; and
   b. a processing component coupled to the memory, the processing component configured for processing the application.

27. A network of devices comprising:
   a. a content store device for storing and supplying content including a plurality of content items, wherein one or more of the plurality of content items have item licensing information that restricts the use of the individual content item and the plurality of content items are a part of a content group having group licensing information that restricts the use of the content group as a unit;
   b. a licensing device for providing the item licensing information and the group licensing information;
   c. a personal library device containing a personal library for providing use management of the content using the item licensing information, the group licensing information and user information such that use of the plurality of content items of the content group complies with the restrictions of the group licensing information and use of the individual content items comply with the corresponding item licensing information; and
   d. a plurality of user devices for providing the user information, receiving the content and presenting the content on each device;
the personal library further for synchronizing the content, including removing invalid content, among the personal library and the plurality of user devices using a push notification automatically when the personal library changes, wherein a second content similar to the content is pushed to the plurality of user devices, and further wherein the second content is not an advertisement.

* * * * *